US011907349B2

(12) United States Patent
Rennich et al.

(10) Patent No.: US 11,907,349 B2
(45) Date of Patent: Feb. 20, 2024

(54) PASSWORDLESS AUTHENTICATION (71) Applicant: JAMF Software, LLC, Minneapolis, MN (US)

(72) Inventors: Joel Rennich, West Lakeland, MN (US); Josh Wisenbaker, Winston-Salem, NC (US); Kyle Wainwright Hammond, Saint Paul, MN (US)

(73) Assignee: JAMF Software, LLC, Minneapolis, MN (US)

( * ) Notice: Subject to any disclaimer, the term of this patent is extended or adjusted under 35 U.S.C. 154(b) by 47 days.

(21) Appl. No.: 17/469,829

(22) Filed: Sep. 8, 2021

(65) Prior Publication Data
US 2022/0100832 A1 Mar. 31, 2022

Related U.S. Application Data (60) Provisional application No. 63/084,449, filed on Sep. 28, 2020.

(51) Int. Cl.
*G06F 21/32* (2013.01)
*G06F 21/33* (2013.01)
*H04L 9/30* (2006.01)
*H04L 9/32* (2006.01)

(52) U.S. Cl.
CPC .............. *G06F 21/32* (2013.01); *G06F 21/33* (2013.01); *H04L 9/3066* (2013.01); *H04L 9/3263* (2013.01); *H04L 2209/80* (2013.01)

(58) Field of Classification Search
CPC ....... G06F 21/32; G06F 21/33; H04L 9/3066; H04L 9/3263; H04L 2209/80

USPC .......................................................... 726/10
See application file for complete search history.

(56) References Cited

U.S. PATENT DOCUMENTS

| | | | |
|---|---|---|---|
| 10,686,781 B1 * | 6/2020 | Kaditz | H04L 67/10 |
| 2013/0111208 A1 | 5/2013 | Sabin et al. | |
| 2014/0162549 A1 * | 6/2014 | Sanuallah | H04W 4/80 |
| | | | 455/41.1 |
| 2014/0232526 A1 * | 8/2014 | Carper | G06V 40/1324 |
| | | | 340/5.83 |
| 2015/0249540 A1 | 9/2015 | Khalil et al. | |
| 2016/0337131 A1 * | 11/2016 | de Andrada | H04L 9/14 |
| 2017/0250974 A1 | 8/2017 | Antonyraj et al. | |
| 2020/0007334 A1 * | 1/2020 | Shah | H04L 9/3247 |
| 2020/0052905 A1 * | 2/2020 | Mathias | H04L 9/006 |
| 2020/0327219 A1 * | 10/2020 | Bolimovsky | H04W 12/68 |
| 2020/0410123 A1 * | 12/2020 | Chen | G06F 40/171 |
| 2021/0306320 A1 * | 9/2021 | Squire | H04W 12/084 |
| 2022/0029802 A1 * | 1/2022 | Ebrahimi | H04L 9/3247 |

(Continued)

OTHER PUBLICATIONS

Lyastani, Sanam G. et al., "Is FIDO2 the Kingslayer of User Authentication? A Comparative Usability Study of FIDO2 Passwordless Authentication." 2020 IEEE Symposium on Security and Privacy (SP), dated May 18, 2020, 19 pages.

(Continued)

*Primary Examiner* — Samson B Lemma
(74) *Attorney, Agent, or Firm* — BENESCH, FRIEDLANDER, COPLAN & ARONOFF LLP (57) ABSTRACT

Methods for enabling passwordless authentication to ancillary devices and services of a user by utilizing a mobile device of that same user. Systems and machine-readable media are also provided.

20 Claims, 6 Drawing Sheets

(56) References Cited

U.S. PATENT DOCUMENTS

2022/0303120 A1\* 9/2022 Pillai .................. H04L 9/16
2022/0394468 A1\* 12/2022 Avetisov ............. H04L 63/083

OTHER PUBLICATIONS

International Search Report and Written Opinion dated Dec. 13, 2021 for PCT Application No. PCT/US2021/049501, 39 pages.

\* cited by examiner

PASSWORDLESS AUTHENTICATION

CROSS-REFERENCE TO RELATED APPLICATIONS

The present application claims the benefit of priority under 35 U.S.C. § 119 from U.S. Provisional Patent Application Ser. No. 63/084,449 entitled "PASSWORDLESS AUTHENTICATION," filed on Sep. 28, 2020, the disclosure of which is hereby incorporated by reference in its entirety for all purposes.

TECHNICAL FIELD

The present disclosure generally relates to computer systems, and more specifically relates to security features for passwordless authentication to ancillary devices and services using a mobile device.

BACKGROUND

Passwords are increasingly used for authentication of a user to various devices and apps and services within an organization. Managing and entering passwords for a user can be a cumbersome user experience. Although traditional single sign-on technologies have reduced the number of times a user is required to enter their password, there is still room for improvement.

Additionally, passwords are inherently insecure. Although strong passwords can be created, these are typically difficult for a user to remember. The same strong and difficult to remember password, however, may be used across multiple products and platform by a single user, which makes them susceptible to breaches.

The description provided in the background section should not be assumed to be prior art merely because it is mentioned in or associated with the background section. The background section may include information that describes one or more aspects of the subject technology.

SUMMARY

In particular aspects, the present disclosure provides systems and methods that enables passwordless authentication to ancillary devices and services of a user by utilizing a mobile device of that same user.

According to certain aspects of the present disclosure, a computer-implemented method is provided. The method includes generating, at a mobile device, an encrypted key pair comprising an encrypted public key associated with a user of the mobile device. The method includes receiving, at the mobile device, a signed certificate of the encrypted public key associated with the user of the mobile device. The method includes causing, at an ancillary device of the user, responsive to receiving identity data associated with the user that is input at the ancillary device, generation of a local account of the user associated with the signed certificate of the encrypted public key. The method includes receiving, at the mobile device of the user and responsive to generation of the local account, an authentication input of the user. The method includes causing, at the ancillary device and based on determining that the authentication input of the user is valid, transmission of instructions to allow performance of an authorized operation at the ancillary device.

According to other aspects of the present disclosure, a system is provided. The system includes a memory comprising instructions and a processor configured to execute the instructions which, when executed, cause the processor to receive, at a manager device, data comprising at least one managed device. The processor is configured to execute the instructions which, when executed, cause the processor to generate, at a mobile device, an encrypted key pair comprising an encrypted public key associated with a user of the mobile device. The processor is configured to execute the instructions which, when executed, cause the processor to receive, at the mobile device, a signed certificate of the encrypted public key associated with the user of the mobile device. The processor is configured to execute the instructions which, when executed, cause the processor to advertise, wirelessly at the mobile device, the signed certificate of the public key associated with the user of the mobile device. The processor is configured to execute the instructions which, when executed, cause the processor to cause, at an ancillary device of the user, responsive to receiving identity data associated with the user that is input at the ancillary device, generation of a local account of the user associated with the signed certificate of the encrypted public key. The processor is configured to execute the instructions which, when executed, cause the processor to receive, at the mobile device of the user and responsive to generation of the local account, an authentication input of the user. The processor is configured to execute the instructions which, when executed, cause the processor to cause, at the ancillary device and based on determining that the authentication input of the user is valid, transmission of instructions to allow performance of an authorized operation at the ancillary device.

According to other aspects of the present disclosure, a non-transitory machine-readable storage medium comprising machine-readable instructions for causing a processor to execute a method is provided. The method includes generating, at a mobile device, an encrypted key pair comprising an encrypted public key associated with a user of the mobile device. The method includes receiving, at the mobile device, a signed certificate of the encrypted public key associated with the user of the mobile device. The method includes causing, at an ancillary device of the user, responsive to receiving identity data associated with the user that is input at the ancillary device, generation of a local account of the user associated with the signed certificate of the encrypted public key. The method includes receiving, at the mobile device of the user and responsive to generation of the local account, biometric input of the user. The method includes causing, at the ancillary device and based on determining that the biometric input of the user is valid, transmission of instructions to allow performance of an authorized operation at the ancillary device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to organization settings, these are examples only and are not to be considered limiting. The teachings of the present disclosure may be applied to other mobile device environments, including but not limited to home environments, retail environments, and other environments well-known in the industry. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed methods and systems provide for enabling passwordless authentication to ancillary devices and services using a mobile device. For example, a user of the mobile device, such as a mobile phone, can extend the biometric authentication capability of their mobile device to be used for authentication to other ancillary devices (e.g., a workstation) and services. This provides a better experience for the user, removing the need for the user to remember or enter passwords. It also provides a more secure experience since biometrics are more difficult to mimic/duplicate than passwords.

The disclosed methods and systems address a technical problem tied to computer technology and arising in the realm of mobile device management, namely the technical problem of managing, entering, and authenticating passwords on multiple devices and services. The disclosed methods and systems solve this technical problem by securely enabling a mobile device of a user to authenticate ancillary devices and services of the same user.

Figure 1:
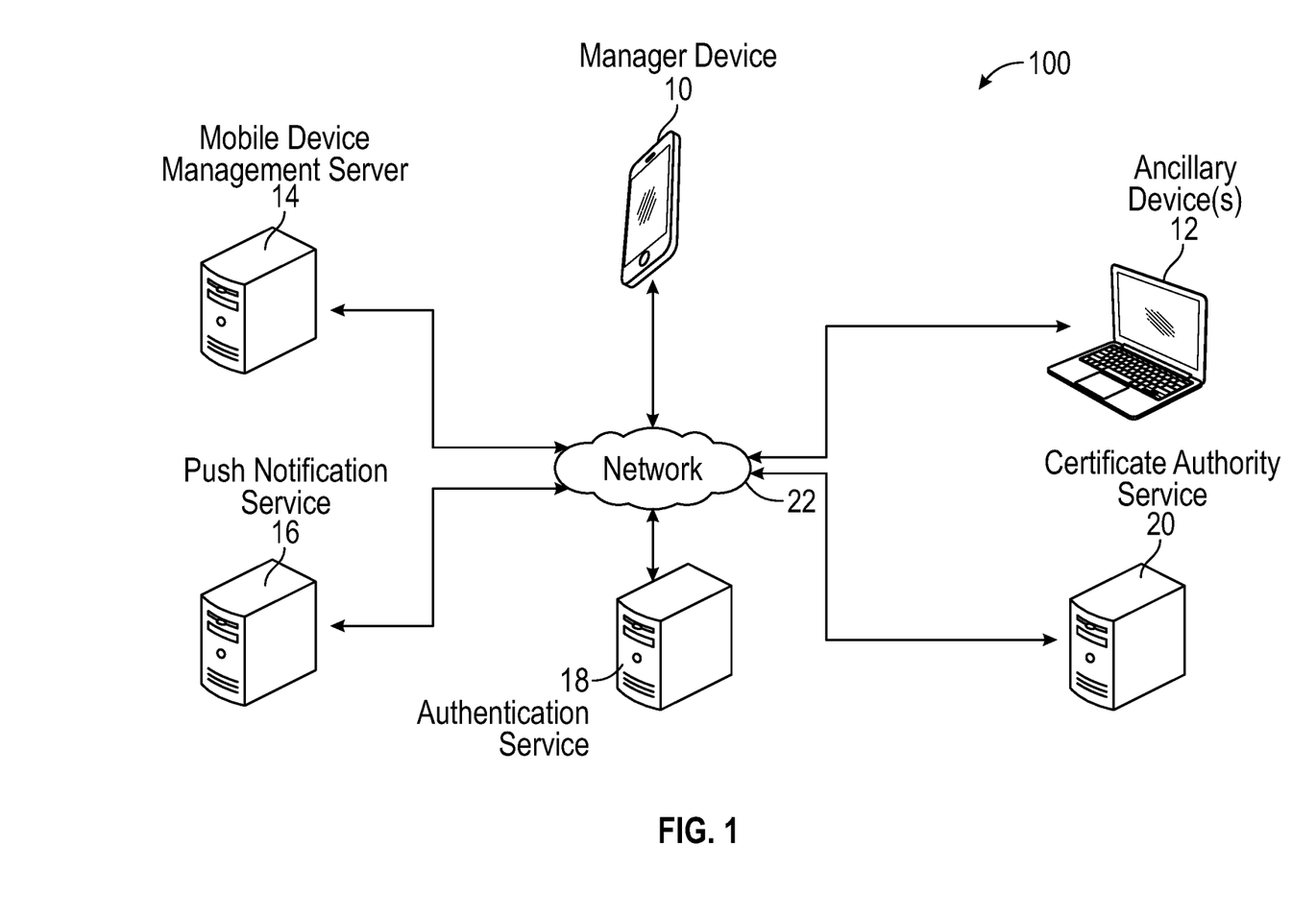
FIG. 1 illustrates an example architecture for enabling passwordless authentication to ancillary devices and services using a mobile device.

FIG. 1 illustrates an example architecture 100 for enabling passwordless authentication to ancillary devices and services using a mobile device. For example, the architecture 100 includes a mobile device 10, at least one ancillary device 12, a mobile device management server 14, a push notification service 16, an authentication service 18, and a certificate authority service 20 all connected over a network 22. In certain aspects, the mobile device management server 14 may be connected to the push notification service 16 over a separate network.

The mobile device management server 14 can be any device having an appropriate processor, memory, and communications capability for communicating with the mobile device 10, the ancillary device 12, and the push notification service 16. For purposes of load balancing, the mobile device management server 14 may include multiple servers. The push notification service 16 can be any device having an appropriate processor, memory, and communications capability for communicating with the mobile device management server 14, the mobile device 10, and the ancillary device 12. The authentication service 18 can be any device having an appropriate processor, memory, and communications capability for communicating with the mobile device 10. The certificate authority service 20 can be any device having an appropriate processor, memory, and communications capability for communicating with the mobile device 10.

The mobile device 10, to which the mobile device management server 14 communicates with over the network 22, can be, for example, a mobile phone, a tablet computer, a mobile computer, a laptop computer, a portable media player, an electronic book (eBook) reader, or any other device having appropriate processor, memory, and communications capabilities. The ancillary device 12, to which the mobile device management server 14 communications with over the network 22 via the push notification service 16, can be, for example, a workstation, a tablet computer, a mobile phone, a mobile computer, a laptop computer, a portable media player, an electronic book (eBook) reader, or any other device having appropriate processor, memory, and communications capabilities. In certain aspects, the mobile device management server 14, the push notification service 16, the authentication service 18, and the certificate authority service 20 can be a cloud computing server of an infrastructure-as-a-service (IaaS) and be able to support a platform-as-a-service (PaaS) and software-as-a-service (SaaS) services.

It should be noted that although one mobile device 10 and at least one ancillary device 12 are shown in FIG. 1, the present disclosure is not limited to any particular configuration or number of devices. In certain aspects, a different number of mobile devices and/or ancillary devices may be present.

The network 22 can include, for example, any one or more of a personal area network (PAN), a local area network (LAN), a campus area network (CAN), a metropolitan area network (MAN), a wide area network (WAN), a broadband network (BBN), the Internet, and the like. Further, the network 22 can include, but is not limited to, any one or more of the following network topologies, including a bus network, a star network, a ring network, a mesh network, a star-bus network, tree or hierarchical network, and the like.

Figure 2:
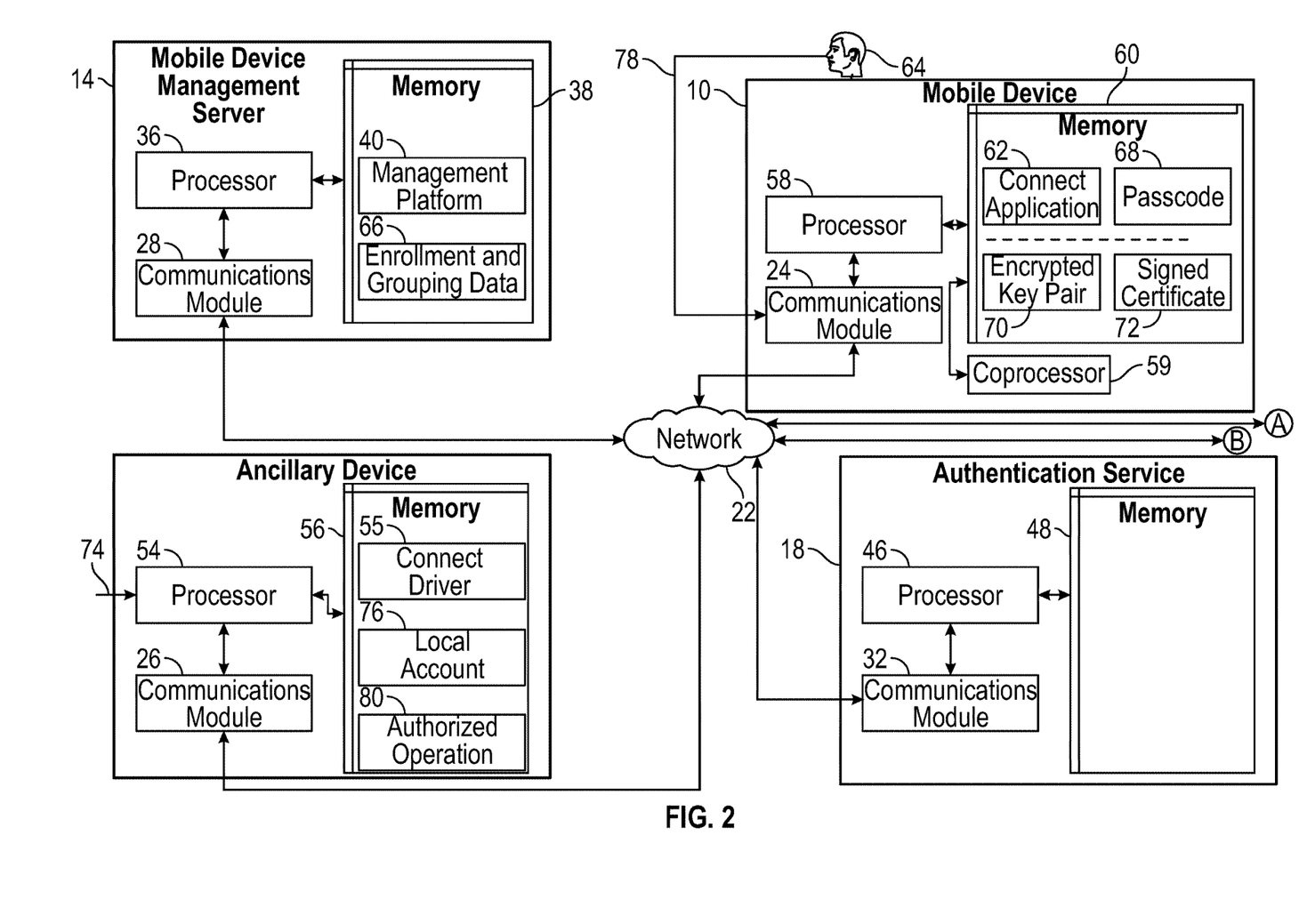
FIG. 2 is a block diagram illustrating the example mobile device, ancillary device, mobile management server, push notification service, authentication service, and certificate authority server from the architecture of FIG. 1 according to certain aspects of the disclosure.

FIG. 2 is a block diagram illustrating examples of the mobile device 10, the ancillary device 12, the mobile device management server 14, and the push notification service 16, the authentication service 18, and the certificate authority service 20 in the architecture of FIG. 1 according to certain aspects of the disclosure.

The mobile device 10, the ancillary device 12, the mobile device management server 14, the push notification service 16, the authentication service 18, and the certificate authority service 20 are connected over the network 22 via respective communications modules 24, 26, 28, 30, 32, 34. The communications modules 24, 26, 28, 30, 32, 34 are configured to interface with the network 22 to send and receive information, such as data, requests, responses, and commands to other devices on the network 22. The communications modules 24, 26, 28, 30, 32, 34 can be, for example, modems or Ethernet cards.

The mobile device management server 14 includes a processor 36, the communications module 28, and a memory 38 that includes a management platform 40. The processor 36 of the mobile device management server 14 is configured to execute instructions, such as instructions physically coded into the processor 36, instructions received from software in the memory 38, or a combination of both.

The push notification service 16 includes a processor 42, the communications module 30, and a memory 44. The processor 42 of the push notification service 16 is configured to execute instructions, such as instructions physically coded into the processor 42, instructions received from software in the memory 44, or a combination of both.

The authentication service 18 includes a processor 46, the communications module 32, and a memory 48. The processor 46 of the authentication service 18 is configured to execute instructions, such as instructions physically coded into the processor 46, instructions received from software in the memory 48, or a combination of both.

The certificate authority service 20 includes a processor 50, the communications module 34, and a memory 52. The processor 50 of the certificate authority service 20 is configured to execute instructions, such as instructions physically coded into the processor 50, instructions received from software in the memory 52, or a combination of both.

The ancillary device 12 includes a processor 54, the communications module 26, and a memory 56 that includes a connect driver and daemon 55. The processor 40 of the ancillary device 12 is configured to execute instructions, such as instructions physically coded into the processor 54, instructions received from software in memory 56, or a combination of both. The connect driver and daemon 55 can be pre-installed, installed via the app storefront, installed through the mobile device management server 14 either directly or via the push notification service 16, or installed by any other manner well-known in the industry.

The mobile device 10 includes a processor 58, a coprocessor 59, the communications module 24, and a memory 60 that includes a connect application 62. The processor 58 of the manager device 10 is configured to execute instructions, such as instructions physically coded into the processor 58, instructions received from software in memory 60, or a combination of both. In certain aspects, the coprocessor 59 is filtered from the processor 58 and is configured to access an encrypted portion of the memory 60. In such aspects, the coprocessor 59 is configured to handle keys and other info, such as biometrics. The connect application 62 allows a user 64 of the mobile device 10 to enable passwordless authentication to the at least one ancillary device 12 and other services associated with the user 64 of the mobile device 10.

The mobile device management server 14 may correspond to hardware and/or software that implement mobile device management functions. For example, in an organization context, the mobile device management server 14 may manage employee devices. The mobile device management server 14 may store (or access) enrollment and grouping data 66. The enrollment and grouping data 66 may include enrollee data identifying all mobile devices that are managed by the mobile device management server 14, such as data associated with the mobile device 10 and the ancillary device 12.

It should be noted that although various embodiments may be described herein with reference to organization settings, this is for example only and not to be considered limiting. The teachings of the present disclosure may be applied in other mobile device environments, including but not limited to corporate environments, enterprise environments, home environments, educational environments, retail environments, healthcare environments, government environments, and other environments well-known in the industry.

The mobile device 10 may include a passcode 68 stored in the memory 60. For example, the passcode 68 may be used to secure access to the mobile device 10. When the user 64 (e.g., employee) attempts to operate the mobile device 10, the user 64 may be prompted to input a passcode, and access to the mobile device 10 may not be enabled unless the inputted passcode matches the first passcode 68. The mobile device 10 may also include one or more apps. The apps may be pre-installed or may be installed after being downloaded (e.g., via an app storefront). In the example of FIG. 2, which corresponds to an exemplary organization setting, the apps include the connect application 62, which can be pre-installed, installed via the app storefront, installed through the mobile device management server 14 either directly or via the push notification service 16, or installed by any other manner well-known in the industry.

Figure 3:
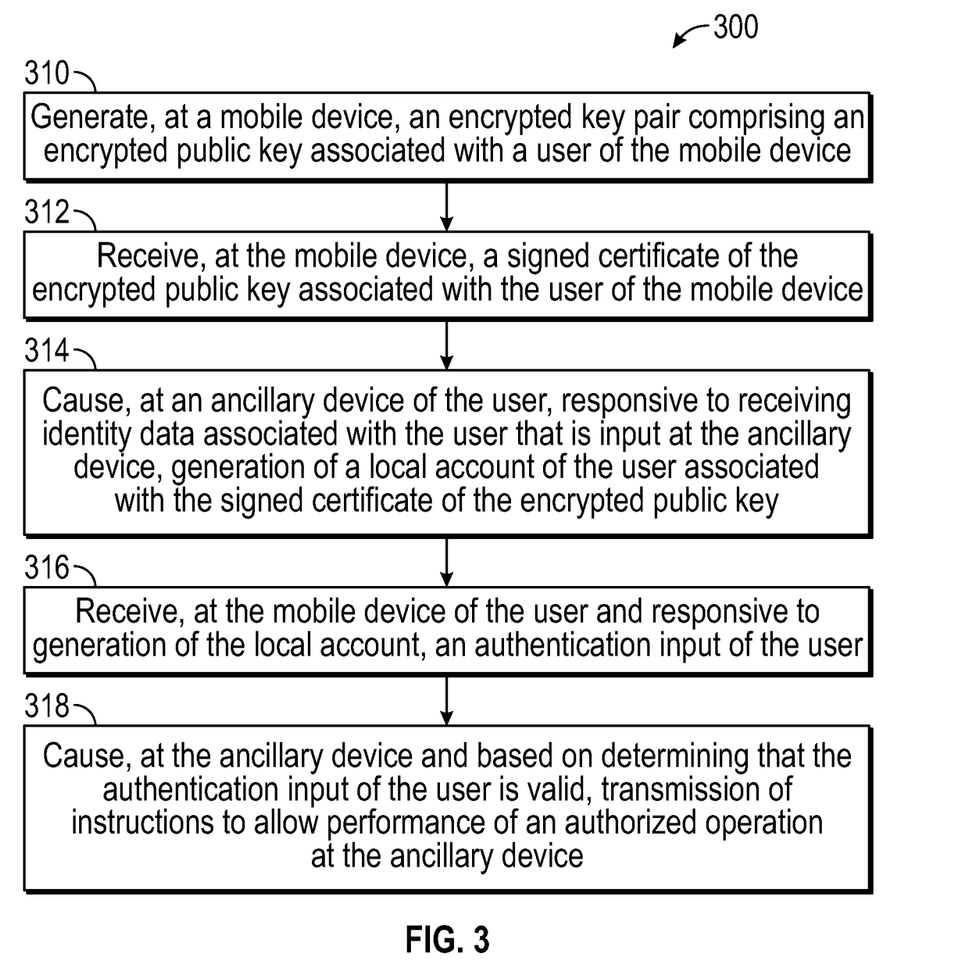
FIG. 3 illustrates an example process for using the mobile device, ancillary device, mobile management server, push notification service, authentication service, and certificate authority server of FIG. 2.

FIG. 3 illustrates an example process 300 using the mobile device 10, the ancillary device 12, the mobile device management server 14, the push notification service 16, the authentication service 18, and the certificate authority service 20. While FIG. 3 is described with reference to FIG. 2, it should be understood that the process steps of FIG. 3 may be performed by other systems.

The process begins by proceeding to step 310 when the processor 58 of the mobile device 10 generates an encrypted key pair 70 including a public key associated with the user 64 of the mobile device 10. As depicted at step 312, the processor 58 of the manager device 10 receives a signed certificate 72 of the encrypted public key associated with the user 64 of the mobile device 10. At step 314, the connect driver and daemon 55, responsive to receiving identity data 74 associated with the user 64 that is input at the ancillary device 12, causes the coprocessor 59 of the ancillary device 12 to generate a local account 76 of the user associated with the signed certificate 72 of the encrypted public key. Moving to step 316, responsive to the generation of the local account 76, the processor 58 of the mobile device 10 receives an authentication input 78 (e.g., biometric) of the user 64.

As illustrated at step 318 the connect driver and daemon 55, based on determining that the authentication input 78 of the user 64 is valid, transmits instructions to the ancillary device 12 to allow performance of an authorized operation 80 at the ancillary device 10.

Figure 4:
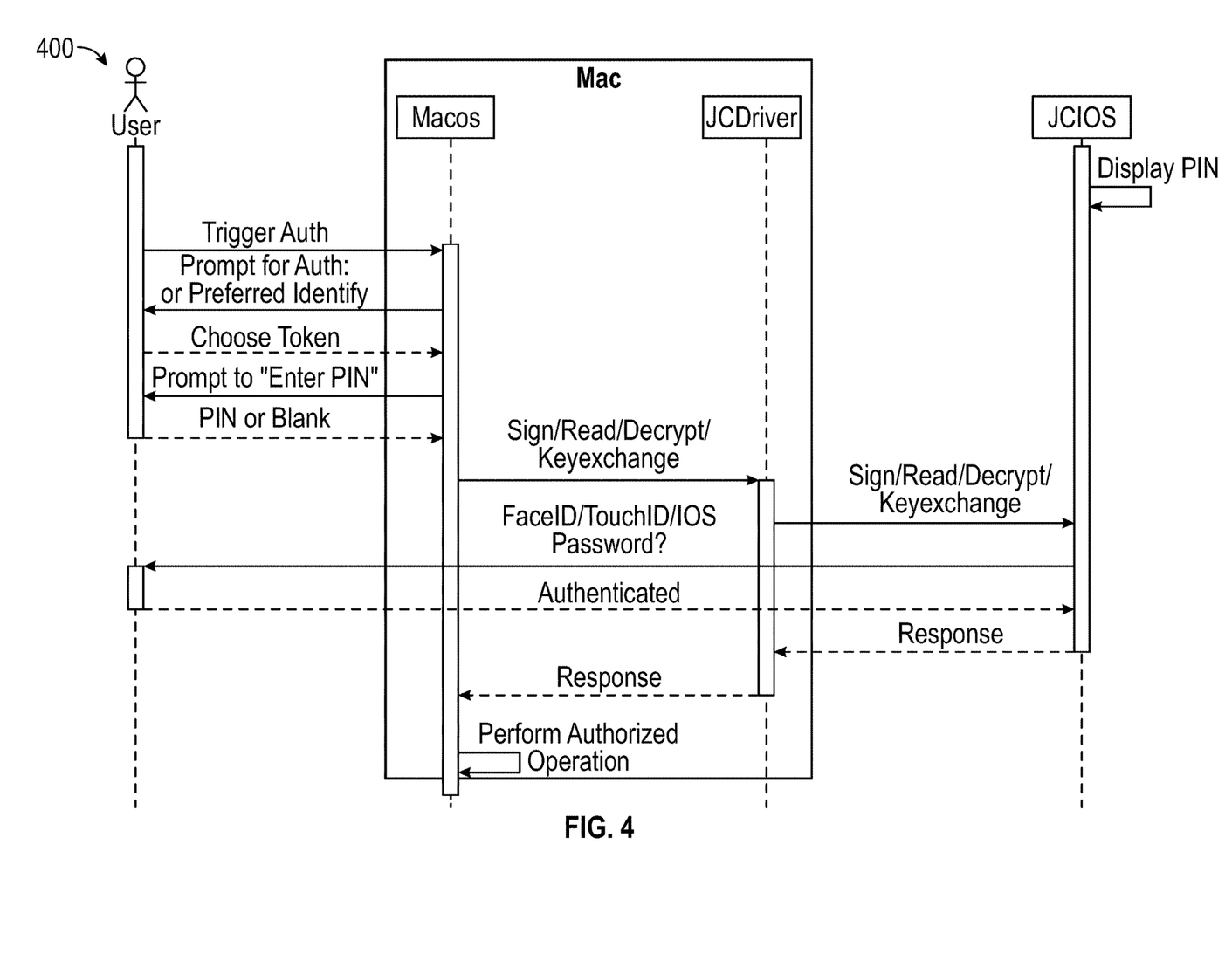
FIG. 4 is an example flow diagram associated with the example process of FIG. 3.

With reference to the example process 300 of FIG. 2 and the example flow diagram 400 of FIG. 4, an example workflow will now be described. The connect application 62 is installed on the mobile device 10. When the connect application 62 is opened on the mobile device 10, a prompt is displayed for the user 64 to authenticate to a cloud authentication service, such as the authentication service 18, to prove the identity of the user 64. After the identity of the user 64 is authenticated, the encrypted key pair 70, which can be an elliptic-curve cryptography key pair, is generated via the coprocessor 59 of the mobile device 10. The encrypted key pair 70 includes an encrypted public key, which is utilized to generate a certificate signing request. The certificate signing request is transmitted to a Certificate Authority (e.g., the certificate authority service 20) for signing and the signed certificate 74 is returned (e.g., received by) the mobile device 10. Although one certificate is described in this example, it should be noted that the number of certificates that can be established is not limited. Once the signed certificate 74 has been setup on the mobile device 10, it will be wirelessly advertised. In certain aspects, the signed certificate 74 can be wirelessly advertised via Bluetooth.

The user 64, who may be an employee at an organization, may need to get authentication on a workstation, such as the ancillary device 12, which has the connect driver and daemon 55 is already installed. A cloud authentication dialog box is displayed at the login window on the ancillary device 12. The user 64 will be able to choose the method of authentication such as, but not limited to, passwordless authentication associated with the connect application 62, an Authentication application, FIDO2, a push notification, SMS, and other method well-known in the industry. After authentication, a local account 76 associated with the user 64 is created with the signed certificate 74 via the connect driver and daemon 55 at the ancillary device 12 as an additional Authentication Authority for the account associated with the user 64. It should be noted, however, that while a password is not required for the connect application 62, the local account may still have an associated password.

The login window at the ancillary device 12 then proceeds to display a personal identification number prompt for the user 64. In certain aspects, the user 64 inputs the identity data 74 at the ancillary device 12. In such aspects, the identity data 74 can be generated at mobile device 10 on a rotating basis. In other aspects, a personal identification number may not be required and the user 64 can instead click Enter to proceed. After the identity data 74 is input to the ancillary device 12, the user 64 will be prompted for a biometric, such as the authentication input 78, which the user 64 will enter at the mobile device 10. In response to a valid authentication input 78, the user 64 will be authenticated to use the ancillary device 12.

In some examples, the user 64 may need to access an authorized operation 80 on the ancillary device 12. For subsequent authentications of the authorized operation 80, the user 64 will go through a similar flow as described above. If the mobile device 10 is awake and the connect application 62 is running, the authentication input 78 may be authenticated without the user even noticing.

Figure 5:
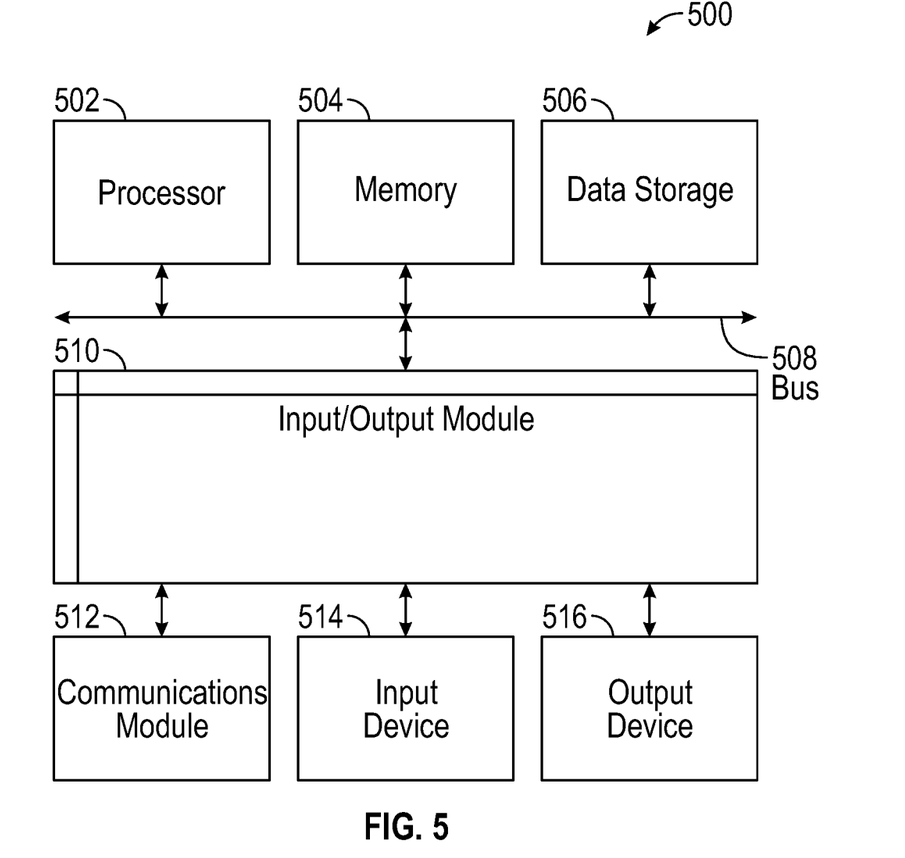
FIG. 5 is block diagram illustrating an example computer system with which the mobile device, ancillary device, mobile management server, push notification service, authentication service, and certificate authority server of FIG. 2 can be implemented.

FIG. 5 is a block diagram illustrating an example computer system 500 with which the mobile device 10, the ancillary device 12, the mobile device management server 14, the push notification service 16, the authentication service 18, and the certificate authority service 20 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the mobile device 10, the ancillary device 12, the mobile device management server 14, the push notification service 16, the authentication service 18, and the certificate authority service 20) includes a bus 508 or other communication mechanism for communicating information, and a processor 502 (e.g., the processor 36, 42, 46, 50, 54, 58) coupled with bus 508 for processing information. According to one aspect, the computer system 500 can be a cloud computing server of an IaaS that is able to support PaaS and SaaS services.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., the memory 38, 44, 48, 52, 56, 60), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., the communications module 24, 26, 28, 30, 32, 34) include networking interface cards, such as Ethernet cards and modems.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure the mobile device 10, the ancillary device 12, the mobile device management server 14, the push notification service 16, the authentication service 18, and the certificate authority service 20 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
   installing an application on a mobile device, wherein the application is received by the mobile device via a push notification service, wherein the application is configured to enable passwordless authentication to an ancillary device of the user;
   installing a driver and a daemon on the ancillary device, wherein the driver and the daemon are received by the ancillary device via the push notification service;
   generating, at the mobile device, an encrypted key pair comprising an encrypted public key associated with a user of the mobile device;
   receiving, at the mobile device, a signed certificate of the encrypted public key associated with the user of the mobile device;
   causing, at the ancillary device of the user via the driver and the daemon, responsive to receiving identity data associated with the user that is input at the ancillary device, generation of a local account of the user associated with the signed certificate of the encrypted public key;
   receiving, at the mobile device of the user and responsive to generation of the local account, an authentication input of the user; and
   causing, at the ancillary device and based on determining that the authentication input of the user is valid, transmission of instructions to allow performance of an authorized operation at the ancillary device.

2. The computer-implemented method of claim 1, further comprising:
   advertising, wirelessly at the mobile device, the signed certificate of the public key associated with the user of the mobile device.

3. The computer-implemented method of claim 1, wherein the identity data associated with the user is a personal identification number.

4. The computer-implemented method claim 3, wherein the personal identification number is generated rotatingly at the mobile device.

5. The computer-implemented method of claim 1, wherein the signed certificate of the public key associated with the user of the mobile device is signed by a Certificate Authority in response to Certificate Signing Request.

6. The computer-implemented method of claim 1, wherein the encrypted key pair is generated by a coprocessor of the mobile device.

7. The computer-implemented method of claim 1, wherein the encrypted key pair is generated with elliptic-curve cryptography.

8. The computer-implemented method of claim 1, wherein the authentication input is a biometric of the user.

9. The computer-implemented method of claim 8, wherein the biometric of the user is based on facial features of the user.

10. The computer-implemented method of claim 8, wherein the biometric of the user is based on a fingerprint of the user.

11. A system comprising:
a memory comprising instructions; and
a processor configured to execute the instructions which, when executed, cause the processor to:
install an application on a mobile device, wherein the application is received by the mobile device via a push notification service, wherein the application is configured to enable passwordless authentication to an ancillary device of the user;
install a driver and a daemon on the ancillary device, wherein the driver and the daemon are received by the ancillary device via the push notification service;
generate, at the mobile device, an encrypted key pair comprising an encrypted public key associated with a user of the mobile device;
receive, at the mobile device, a signed certificate of the encrypted public key associated with the user of the mobile device;
advertise, wirelessly at the mobile device, the signed certificate of the public key associated with the user of the mobile device;
cause, at the ancillary device of the user via the driver and the daemon, responsive to receiving identity data associated with the user that is input at the ancillary device, generation of a local account of the user associated with the signed certificate of the encrypted public key;
receive, at the mobile device of the user and responsive to generation of the local account, an authentication input of the user; and
cause, at the ancillary device and based on determining that the authentication input of the user is valid, transmission of instructions to allow performance of an authorized operation at the ancillary device.

12. The system of claim 11, wherein the identity data associated with the user is a personal identification number.

13. The system of claim 12, wherein the personal identification number is generated rotatingly at the mobile device.

14. The system of claim 11, wherein the signed certificate of the public key associated with the user of the mobile device is signed by a Certificate Authority in response to Certificate Signing Request.

15. The system of claim 11, wherein the encrypted key pair is generated with elliptic-curve cryptography.

16. The system of claim 11, wherein the authentication input is a biometric of the user.

17. A non-transitory machine-readable storage medium comprising machine-readable instructions for causing a processor to execute a method, the method comprising:
installing an application on a mobile device, wherein the application is received by the mobile device via a push notification service, wherein the application is configured to enable passwordless authentication to an ancillary device of the user;
installing a driver and a daemon on the ancillary device, wherein the driver and the daemon are received by the ancillary device via the push notification service;
generating, at the mobile device, an encrypted key pair comprising an encrypted public key associated with a user of the mobile device;
receiving, at the mobile device, a signed certificate of the encrypted public key associated with the user of the mobile device;
causing, at the ancillary device of the user via the driver and the daemon, responsive to receiving identity data associated with the user that is input at the ancillary device, generation of a local account of the user associated with the signed certificate of the encrypted public key;
receiving, at the mobile device of the user and responsive to generation of the local account, biometric input of the user; and
causing, at the ancillary device and based on determining that the biometric input of the user is valid, transmission of instructions to allow performance of an authorized operation at the ancillary device.

18. The non-transitory machine-readable storage medium of claim 17, further including instructions for causing the processor to execute the method comprising:
advertising, wirelessly at the mobile device, the signed certificate of the public key associated with the user of the mobile device.

19. The non-transitory machine-readable storage medium of claim 18, wherein the identity data associated with the user is a personal identification number.

20. The non-transitory machine-readable storage medium of claim 19, wherein the personal identification number is generated rotatingly at the mobile device.

* * * * *